United States Patent [19]
Jung

[11] Patent Number: 5,203,211
[45] Date of Patent: * Apr. 20, 1993

[54] MULTI-PHASE FLOW MEASUREMENT

[76] Inventor: Douglas B. Jung, 3209 Franz Valley Rd., Santa Rosa, Calif. 95404

[*] Notice: The portion of the term of this patent subsequent to Apr. 16, 2008 has been disclaimed.

[21] Appl. No.: 686,246

[22] Filed: Apr. 16, 1991

Related U.S. Application Data

[63] Continuation-in-part of Ser. No. 285,735, Dec. 19, 1988, Pat. No. 5,007,293.

[51] Int. Cl.$^5$ .......................... G01F 1/74; G01F 15/08
[52] U.S. Cl. ...................................... 73/861.04; 73/200
[58] Field of Search ................. 73/200, 861.04, 861.52

[56] References Cited

U.S. PATENT DOCUMENTS

| | | | |
|---|---|---|---|
| 3,643,507 | 2/1972 | Garrett | 73/861.04 |
| 4,144,754 | 3/1979 | Pitts, Jr. et al. | 73/861.06 |
| 4,282,760 | 8/1981 | Pitts, Jr. et al. | 73/861.04 |
| 4,312,234 | 1/1982 | Rhodes et al. | 73/861.04 |
| 4,574,643 | 3/1986 | Scott et al. | 73/861.04 |
| 4,776,210 | 10/1988 | Baillie et al. | 73/861.04 |
| 4,817,439 | 4/1989 | Arnaudeau et al. | 73/861.04 |
| 5,007,293 | 4/1991 | Jung | 73/861.04 |

Primary Examiner—Herbert Goldstein
Attorney, Agent, or Firm—Larry D. Johnson

[57] ABSTRACT

Multi-phase flow measurement in a conduit is accomplished by generating a spin in the flowing fluids and/or entrained solids, by which the centrifugal force separates the flowing components by density. The isolated flow in the central part of the conduit is measured. The denser isolated fractions flowing against the conduit wall can be measured. An overall composite parameter can be measured. These measurements can then be mathematically solved for their individual flowing components. The flowing components re-mix downstream of the apparatus.

12 Claims, 2 Drawing Sheets

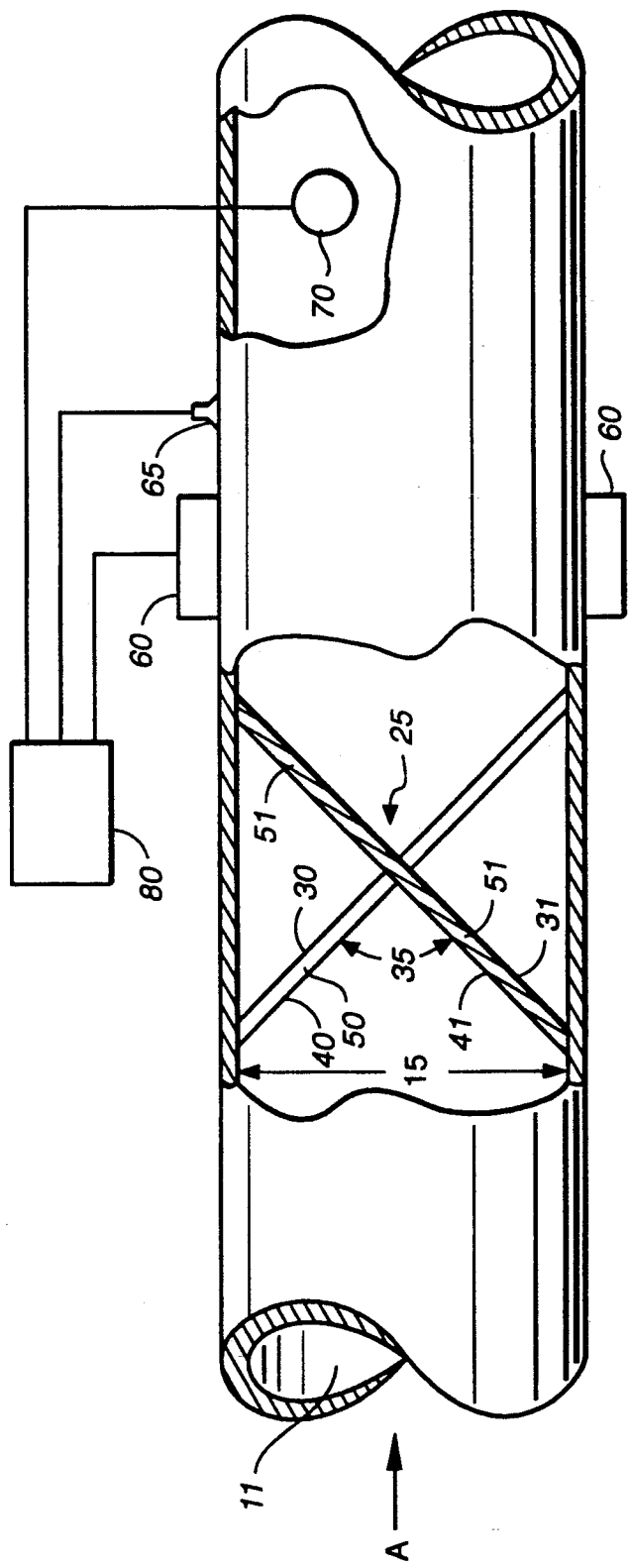
FIG._1

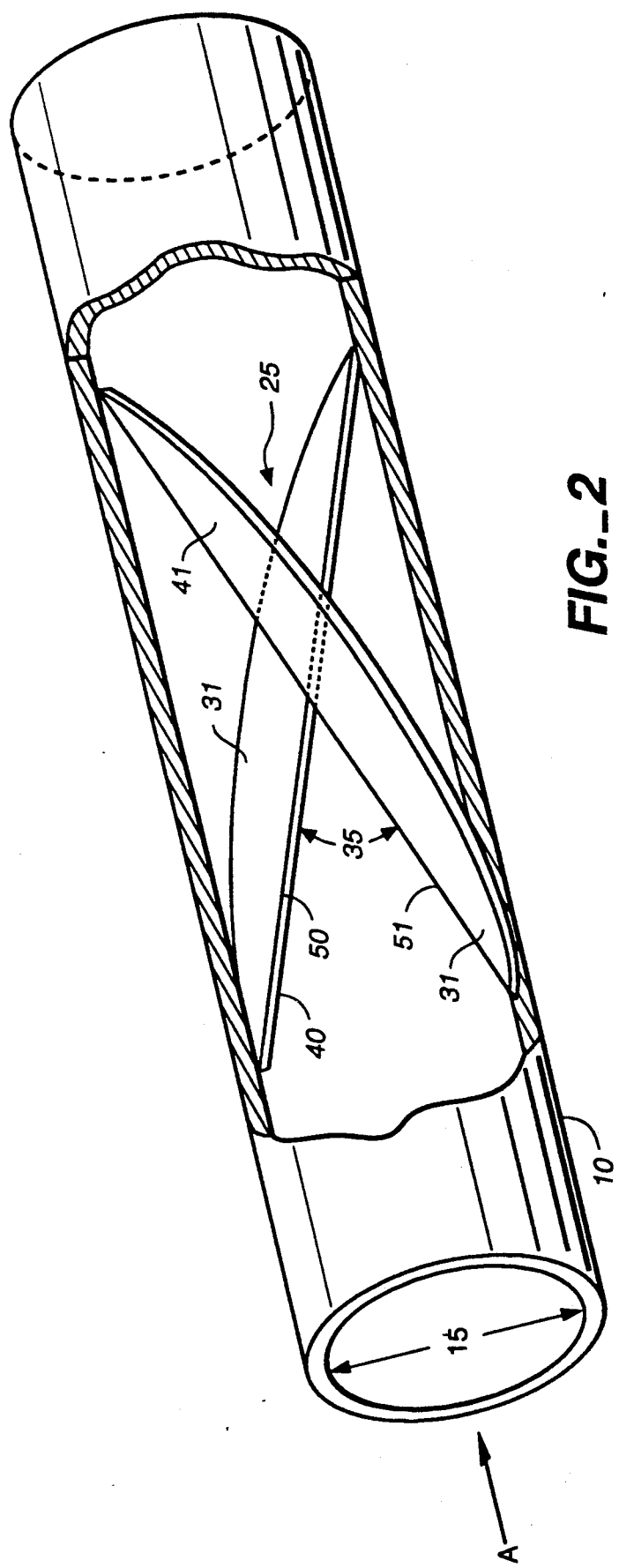
FIG._2

MULTI-PHASE FLOW MEASUREMENT

This application is a continuation in part of copending application Ser. No. 07/285,735, filed Dec. 16, 1988, for a Two Phase Flow Meter now U.S. Pat. No. 5,007,293.

BACKGROUND OF THE INVENTION

1. Field of the Invention

This invention relates generally to measurement devices, and more specifically to an improved flow meter device for measurement of two-phase or multi-phase flow mixtures.

2. Description of the Prior Art

The present invention relates to devices for the measurement of a two-phase or multi-phase flow mixture such as a fluid and a solid; or a vapor, liquid and a solid; or as vapor and liquids flowing within a conduit. Such devices are highly beneficial in the measurement of coal slurry; geothermal steam; noncondensable gas and brine; oil, gas and water; as well as other mixtures containing two or more components. The measurement of two or more phases flowing in a conduit is important or even necessary in the production or processing of fluids. In the oil and gas industry, the production of oil and/or gas is oftentimes accompanied by water. Separation facilities required to isolate each of the phases for individual measurement are expensive, complex and bulky. The present technique temporarily separates the phases within the pipeline for pseudo measurements without the need for permanent separation. Computational techniques can resolve the mixture into individual components. It reduces process complexities and saves valuable space, especially in areas such as offshore platforms.

Prior art patents such as those to Furmaga (U.S. Pat. No. 4,429,581) utilize a complex array of piping and instrumentation including the use of a separator. The patents to Pitts (U.S. Pat. Nos. 4,144,754 and 4,282,760) utilize a rectangular full circle loop whereby a centrifugal force is measured and a density is measured. A volumetric measurement can be utilized by means of a positive displacement flow meter. The patent to Arnold et al. (U.S. Pat. No. 4,272,982) measures density within a built-in positive displacement flow meter. The patent to Sabin (U.S. Pat. No. 4,604,902) utilizes a venturi coupled with an array of temperature differential flow meters. There are other techniques used to measure multi-phase flow, but most utilize mixers to blend the total flow prior to measurement. All of these prior art devices are very different from the present device.

Applicants aforementioned co-pending application stresses the measurement of two-phase flow. However, the measurement of two or more phases can be readily accomplished using the basic techniques established, with additional measurements, and/or modifications, as described herein.

SUMMARY OF THE INVENTION

The multi-phase flow meter of this invention provides a relatively simple, compact, rugged and easily manufactured flow meter for the measurement of a flow with two or more flowing components. In operation, a mixture of vapors, liquids and/or solids flows through a pipe or conduit. The flow enters a spin generating device. The spin generating element causes a directional change in the flow vector which in effect causes the mixture to spin down the pipeline. In an oil, water and gas system, the spin flings and holds the denser (oil and water) fraction against the conduit wall forming an annulus, allowing the less dense (gas) fraction to flow through the annulus, i.e., the hole formed by the ring of fluids. With the mixture separated, a flow measurement is taken in the central portion of the conduit. This measurement will give a first order approximation of the (gas) flowing component in terms of a mass or a volumetric rate. A second series of measurements can be taken downstream of the spin generating element. These measurements can be used to determine the component fractions (liquid/vapor ratio), the ratio within the denser component (oil/water ratio), and other physical or electrical parameters. With these measurements, computational techniques can resolve the mixture into individual (oil/water/gas) components.

The preferred spin generating element in the present device is comprised of two semi-elliptical blades or plates. The plates are diagonally positioned within the pipe such that an angle is formed between them. As the flow travels across the plate, it is split into two helical flow patterns creating a rotational movement in the flow stream. The rotational movement in the flow stream generates an outward force, believed to be a centrifugal force, which causes the denser liquids and entrained solids to be forced outward against and onto the inner surface of the conduit. The lower density fluids (e.g., vapor and gasses) will flow through the annulus (central portion of the conduit). The spin generating element can be of any configuration or arrangement so long as a rotational or swirl movement is developed within the conduit to cause a separation of phases.

Downstream of the spin generating element the phases are temporarily separated. Using oil, water and gas as the example, the oil and water are spiraling against the pipe wall and the lighter fraction gas is flowing through the annulus surrounded by the liquid fraction and contained by the conduit. As such, a gas measurement (oil/water/gas) can be taken in the annular liquid free region. The measuring instrument can be any of a number of devices such as pitot-static, averaging pitot, turbine, vortex, thermal, ultrasonic, etc. Since the conduit is partially filled with liquid, the annular vapor measurement does not represent an absolute quantity.

A second series of measurements are taken within or across the separated region. In the case of an oil, water and gas system, the oil and water are commingled, spiraling together down the pipeline with the gas flowing through the center of the conduit. The gas and liquid are separated. The oil and water are flowing together contained by the pipe wall on one side and the gas interface on the other side.

As a result of the separated liquid/vapor (oil and water/gas) interface, the fluid thickness, fluid velocity, fluid density, absorption characteristics, fluid electrical properties, etc. can be measured with minimal gas interference. One or more of these parameters can be used as part of the combination series. Examples of such measuring instruments include ultrasonic, admittance, microwave, density, capacitance, inductance, optic, temperature, pressure, various flow meters, etc.

An overall measurement can be utilized in conjunction with the above series to resolve the independent flowing components. These measurements are simplified as a result of the separated, stratified gas/liquid layers. The measurements can be an overall (oil, water and gas) flow density, absorption characteristics, electrical parameters for ratios, etc. Examples of such measuring instruments include a gamma ray densitometer, capacitance sensor, admittance, impedance, inductance, microwave, optic, etc.

Other measurements can be used to determine independent phase parameters. Such measurements could be a temperature, pressure, flow, electrical or other physical properties, etc.

A combination of the above series of measurements could include a pseudo vapor rate, a liquid interface measurement, or an overall bulk fluid electrical measurement indicative of density or a ratio relationship. Other miscellaneous measurements such as pressure, temperature, fluid velocity, and electrical parameters are optional. A microprocessor can be used to calculate and resolve the inputs into individual components.

The novel features of this invention that produce new and unexpected results include the following:

a. The metering concept utilizes the principal of phase separation and measurement without the use of large and bulky vessels, and complex control systems.

b. The metering not expose conventional single phase flow met flow regimes for the purpose of volumetric or pseudo determination.

c. The temporary separation of phases within the conduit, allows for the simplified measurement of pseudo phases within a compact device.

d. The device does not utilize rectangular conduits, high maintenance positive displacement flow meters, orifices, venturi, meters, pumps or gas/liquid mixers.

BRIEF DESCRIPTION OF THE DRAWINGS

FIG. 1 is a partially cutaway side elevation view of the two-phase/multi-phase flow meter of this invention as installed in a section of conduit; and FIG. 2 is a partially cutaway perspective view of a section of conduit, illustrating a spin generating element used to create the swirl motion in the flow stream in accordance with the preferred embodiment of this invention.

DETAILED DESCRIPTION OF A PREFERRED EMBODIMENT

FIG. 1 is a partially cutaway side elevational view of the two-phase/multi-phase flow meter of this invention as installed in a section of conduit, while FIG. 2 is a partially cutaway perspective view of a section of conduit, illustrating a spin generating element used to create the swirl motion in the flow stream in accordance with the preferred embodiment of this invention. The conduit 10 has an inner surface 11 with an inside diameter 15, and defines a circular passage through which the mixture flows, in the direction as indicated by arrow A. The spin generating element 25 comprises two blades 30, 31 which are preferably of a semi-elliptical shape. Each blade 30, 31 comprises two opposing planar surfaces 40, 41 and generally straight edges 50, 51, between said surfaces 40, 41. Surfaces 40, 41 of each blade are the surface that the flowstream impinges upon as it flows through the conduit 10 in direction A. These blades 30, 31 are preferable diagonally positioned within conduit 10, such that an angle 35, as best seen in FIG. 1, is formed between edges 50, 51 of each blade. Angle 35, which will be somewhat dependent on the length of the blades 30, 31 as measured by the length of edges 50, 51, will be about twenty degrees to about ninety degrees, and preferably about sixty degrees. The overall length of each blade will be dependent upon the diameter of the conduit used, but will generally range from about two tenths to about five feet. Blades 30, 31 may be secured to the inner surface 11 of pipe 10 by any suitable means, such as by welding.

As flowing two-phase/multi-phase mixture within the conduit 10 enters the spin generating element 25, a directional change is imparted which causes the mixture to continue swirling downstream of blades 30, 31. The swirling motion creates a force which causes the mixture to separate. Using oil, water and gas system as an example, the denser liquid fractions are thrown to inner pipe surface 11 and swirls ten to one hundred pipe diameters or more down the pipe 10 until contacting vortex breakers (not illustrated) installed to eliminate the spin, or the spin energy otherwise dissipates and the fluids re-mix.

Downstream of the spin generating element 25 the liquid fraction is flowing along the inside pipe surface 11 with the liquid free gas fraction flowing within the annulus. This somewhat donut-shape flow, with the liquid fraction forming the donut and the gas flowing through the hole, will be the source of measurements. Within the conduit 10 ar installed sensors used to transmit the flow data for computation.

Installed in conduit 10 downstream of the spin generating element 25 is a bulk fluid sensor 60, which is used to determine bulk fluid characteristics. An example of such a device is a capacitive sensor. The data is transmitted to a microprocessor 80 for computation. The location and placement of the sensor 60 is variable and can be from the end of the spin generating element 25, to ten or more diameters downstream.

Also installed in conduit 10 downstream of the spin generating element 25 is a liquid thickness sensor 65. It is used to determine the interface liquid thickness. An example of such a device is an ultrasonic meter. The data is transmitted to the microprocessor 80 for computation. As before, the placement of the sensor 65 is variable and can be from the edge of the spin generating element 25, to ten or more diameters downstream.

Also installed in conduit 10 downstream of the spin generating element 25 is a flow meter 70 used to measure the pseudo gas rate in the liquid free annular region. An example of such a device is a thermal mass flow meter. The data is transmitted to the microprocessor 80 for computation. As before, the placement of the meter 70 is variable and can be from the edge of the spin generating element, to ten or more diameters downstream.

In the measurement of two-phase/multi-phase flow, the flow compositions may be different, requiring additional parameters. Additional measurements such as temperature, pressure, electrical characteristics, etc. may be required. For different applications, the choice of measurement instrumentation required to meet specific objectives may be altered to fit the need.

Data from instruments 60, 65, 70 and others can be sent to microprocessor 80 for computation. Programmed into the computer are basic equations, tables, and coefficients developed during calibration testing specific to the applied meter.

Notwithstanding the above description of the preferred embodiment of the meter shown, it is understood that many alternative forms of spin generating devices can be used to generate a separation of phases, as well as techniques to measure the pseudo phases, as well as the combination of alternative instruments measuring specific parameters within the separated region to resolve the components.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A flow meter for the measurement of a multi-phase flow within a conduit, said conduit having an inside surface, said flow meter comprising:
   a spin generating element within said conduit, said spin generating element comprising a pair of blades presenting opposing planar surfaces to said flow mixture, said spin generating element conditioned to separate said multi-phase flow into denser components and less dense components, and urge said denser components against said inside surface of said conduit in the form of an annulus, and to urge said less dense components to flow through said annulus;
   first measurement means for measurement of said less dense component's annular rate;
   second measurement means for measurement of said denser components flowing against said conduit inner surface; and
   third measurement means for measurement of the bulk flowing components.

2. The flow meter of claim 1 wherein said first measurement means comprises means for measuring a gas volumetric rate.

3. The flow meter of claim 1 wherein said first measurement means comprises means for measuring a gas mass rate.

4. The flow meter of claim 1 wherein said second measurement means comprises means for measuring fluid thickness.

5. The flow meter of claim 1 wherein said second measurement means comprises means for measuring fluid velocity.

6. The flow meter of claim 1 wherein said second measurement means comprises means for measuring fluid density.

7. The flow meter of claim 1 wherein said second measurement means comprises means for measuring absorption characteristics.

8. The flow meter of claim 1 wherein said second measurement means comprises means for measuring fluid electrical properties.

9. The flow meter of claim 1 wherein said third measurement means comprises means for measuring bulk flow density.

10. The flow meter of claim 1 wherein said third measurement means comprises means for measuring bulk absorption characteristics.

11. The flow meter of claim 1 wherein said third measurement means comprises means for measuring bulk electrical parameters.

12. The flow meter of claim 1 including microprocessor means for computing the individual components of the flowing mixture.

* * * * *